3,642,875
β-ACETOXYPIVALIC ANHYDRIDE AND PROCESS FOR MAKING SAME

Hans-Jurgen Arpe, Fischbach, Taunus, Germany, and Lothar Heinz Hornig, deceased, late of Frankfurt am Main-Schwanheim, Germany, by Anneliese Hornig nee Munich, co-heiress, Frankfurt am Main, Germany, assignors to Farbwerke Hoechst Aktiengesellschaft vormals Meister Lucius & Bruning, Frankfurt am Main, Germany
No Drawing. Filed July 28, 1970, Ser. No. 59,009
Claims priority, application Germany, Aug. 7, 1969,
P 19 40 206.3
Int. Cl. C07c 67/00, 69/16
U.S. Cl. 260—488 J       2 Claims

ABSTRACT OF THE DISCLOSURE

β-Acetoxypivalic anhydride, a novel compound particularly suitable for the manufacture of pivalolactone, and a process for making same by reaction of β-acetoxypivalic acid with an excess amount of acetic anhydride.

The present invention relates to β-acetoxypivalic anhydride and a process for making same.

The present invention provides a process for the manufacture of β-acetoxypivalic anhydride, a well defined novel compound of the following formula

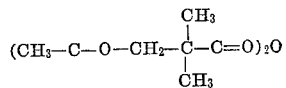

which is a particularly suitable substance for the manufacture of alpha, alpha-dimethylpropiolactone—pivalolactone—, an important monomer which can be polymerized to polypivalolactone, a valuable plastic material.

We have found that β-acetoxypivalic anhydride can be obtained by reacting β-acetoxypivalic acid with an excess amount of acetic anhydride of 4 to 8 times the theoretical molar amount in the absence of a catalyst while continuously distilling off the acetic acid which is being formed.

It has been proposed to make carboxylic anhydrides by reacting the corresponding carboxylic acid with acetic anhydride in the presence of an acid catalyst. These processes have not hitherto been used, however, for the reaction of acetoxypivalic acid to its anhydride. A simple application of these processes to the problem of the manufacture of the anhydride from acetoxypivalic acid as an ester acid has led to only unsatisfactory yields. For it has been found that even with the use of an excess amount of anhydride in the presence of a catalyst only incomplete reactions can be obtained. It was therefore surprising that almost quantitative yields of acetoxypivalic anhydride can be obtained in the absence of a catalyst while distilling off the acetic acid being formed.

As compared with other processes, for example the reaction of hydroxypivalic acid with ketene, the process of the invention has the advantage that it starts from a more easily accessible product, i.e. acetoxypivalic acid (cf. U.S. Pat. 3,251,876).

The β-acetoxypivalic anhydride in accordance with the invention can be thermally split into pivalolactone with a substantially higher extent of conversion and a considerably higher selectivity than β-acetoxypivalic acid itself.

By thermolysis of β-acetoxypivalic acid (cf. Chem. Ber. 101, 2413 (1968)) a selectivity of about 70% pivalolactone can, for example, be obtained on a titanium dioxide catalyst at 280 to 282° C. with an acid conversion of 30 to 35%.

By subjecting the compound of the invention, β-acetoxypivalic anhydride, to thermolysis, a quantitative reaction with a selectivity of 92% pivalolactone can be obtained at a slightly increased temperature of thermolysis of 290 to 300° C.

β-Acetoxypivalic anhydride therefore makes a suitable starting substance for the thermolytic production of pivalolactone which, in its turn, is of particular importance for the manufacture of polypivalolactone, a linear polyester which is used as thermoplastic and for the manufacture of fibers.

Moreover, β-acetoxypivalic anhydride, being a typical anhydride, has the greater reactivity of the acyl radical as compared with the free acid. In comparison with β-acetoxypivalic acid, it has the advantage, for example, that it can be esterified with alcohols to yield directly in a quantitative reaction β-acetoxypivalic acid esters which may be used as additives for lubricating oils when using, for example, long-chain alcohols. Contrary thereto, the free acid already contains an ester grouping in the acetoxy group, which ester grouping would participate by esterinterchange in a further reaction, for example the above esterification of the carboxyl group.

The β-acetoxypivalic anhydride of the invention is a colorless crystalline substance having a melting point of 32 to 34° C. and a boiling point of 140 to 142° C. under 2 millimeters of mercury.

The results of the C, H analysis correspond to the values calculated for the formula $C_{14}H_{22}O_7$: C, 55.62; H, 7.34. Found: C, 55.9; H, 7.5.

The NMR (nuclear magnetic resonance) spectrum shows three singlets at 1.2 p.p.m., 2.0 p.p.m., and 4.1 p.p.m. (displacement towards tetramethylsilane) in a relative ratio of intensity of 6:3:2. This corresponds to the formula for β-acetoxypivalic anhydride. In the infrared spectrum, bands at 1750 and 1820 cm.$^{-1}$ indicate the anhydride structure.

The anhydride can be characterized chemically by the fact that it can be easily converted into β-acetoxypivalic acid esters with various alcohols in the presence of pyridine. By reaction of, for example, β-acetoxypivalic anhydride in a boiling mixture of methanol and pyridine followed by a separation by distillation, the β-acetoxypivalic acid methyl ester (B.P.$_{15}$ 85 to 87° C.).

Calcd. C, 55.2%; H, 8.1%; O, 36.7%. Found: C, 54.6%; H, 8.0%; O, 37.4% can be obtained, for example, in a quantitative yield.

The following examples serve to illustrate the invention.

EXAMPLE 1 (Comparison example)

322 grams of β-acetoxypivalic acid were heated for 6 hours under reflux with 1020 grams acetic anhydride. After distilling off the mixture of acetic acid and acetic anhydride, the β-acetoxypivalic anhydride was distilled at B.P.$_2$ 140 to 142° C. The product was obtained in a yield of 242 grams=80% of the theoretical.

The colorless distillate crystallized and the resulting solid product had a melting point of 32 to 34° C.

When the process was carried out in the presence of an acid catalyst, for example, sulfuric acid or phosphoric acid, the yield was reduced to less than 70% of the theoretical.

EXAMPLE 2

In the manner described in Example 1, 322 grams β-acetoxypivalic acid were heated under reflux with 1020 grams acetic anhydride. The acetic acid formed was continuously removed from the reaction mixture with the help of an effective column. After about 6 hours the acetic anhydride and the residual acetic acid were distilled off and the β-acetoxypivalic anhydride was then distilled at B.P.$_2$. The yield was 290 grams=96% of the theoretical.

What is claimed is:
1. β-Acetoxypivalic anhydride of the following formula

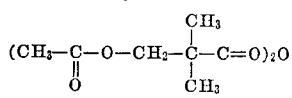

2. A process for the manufacture of β-acetoxypivalic anhydride which comprises reacting β-acetoxypivalic acid with an excess amount of acetic anhydride of 4 to 8 times the theoretical molar amount in the absence of a catalyst while distilling off the acetic acid which is being formed.

References Cited
UNITED STATES PATENTS 2,820,055   1/1958   Caldwell et al. _____ 260—491

LORRAINE A. WEINBERGER, Primary Examiner

V. GARNER, Assistant Examiner

U.S. Cl. X.R.

260—78.3 R, 343.9, 491